United States Patent Office 2,833,728
Patented May 6, 1958

2,833,728

MANUFACTURE OF SOLID PHOSPHORIC ACID CATALYSTS

Mitchell S. Bielawski, Berwyn, Ill., assignor to Universal Oil Products Company, Des Plaines, Ill., a corporation of Delaware No Drawing. Application October 11, 1954
Serial No. 461,687

5 Claims. (Cl. 252—437)

This invention relates to the manufacture of solid catalysts which are useful in accelerating various reactions among organic compounds and particularly reactions involving unsaturated organic compounds.

More particularly, this invention relates to the preparation of a particular type of an improved solid phosphoric acid catalyst which is active in accelerating direct olefin conversion reactions, particularly olefin polymerization reactions.

An object of this invention is to provide a process for preparing an improved solid phosphoric acid catalyst which is utilizable in promoting hydrocarbon conversion reactions.

A further object of this invention is to provide an improved solid phosphoric acid catalyst which is useful in the polymerization of olefinic hydrocarbons, said catalyst having a relatively high degree of activity and after use crushing strength.

One embodiment of this invention resides in a process for the manufacture of a solid phosphoric acid catalyst wherein a phosphoric acid and a siliceous adsorbent are composited and the resulting mixture extruded and calcined, the improvement which comprises treating the siliceous adsorbent with an organic liquid and substantially removing said organic liquid before compositing the siliceous adsorbent with a phosphoric acid.

A specific embodiment of the invention is found in a process for the manufacture of a solid phosphoric acid catalyst which comprises preparing a slurry of a siliceous adsorbent and carbon tetrachloride, removing substantially all of said carbon tetrachloride by conventional means, compositing the adsorbent with a phosphoric acid, extruding and calcining the resultant composite.

A more specific embodiment of the invention resides in a process for the manufacture of a solid phosphoric acid catalyst which comprises mixing from about 20 to about 45 parts by weight of a diatomaceous earth with from about 5 to 10 times its weight of carbon tetrachloride, removing substantially all of the carbon tetrachloride, compositing the remaining mixture with from about 50 to about 75 parts by weight of polyphosphoric acid at a temperature in the range of from about 50° to about 500° F., subjecting the resulting mixture to extrusion, calcining the extruded composite at a temperature in the range of from about 600° to about 1200° F. for a period of time in the range of from about 1 to about 8 hours.

Other objects and embodiments of this invention will be found in the following further detailed description of said invention.

It has now been discovered that the activity and after use crushing strength of a solid phosphoric acid catalyst in direct olefin conversion reactions such as the polymerization of olefins may be raised to a higher level by contacting the siliceous adsorbent with an organic liquid and removing substantially all of this organic material from the siliceous adsorbent prior to compositing the siliceous adsorbent with a phosphoric acid. In the process of the present invention the starting materials for the catalytic composite will comprise an acid of phosphorus such as orthophosphoric acid, pyrophosphoric acid, triphosphoric acid, tetraphosphoric acid, polyphosphoric acid; an organic liquid and a siliceous adsorbent.

The organic liquid which is admixed with the siliceous adsorbent in the process of the present invention is selected from hydrocarbon mixtures boiling in the gasoline range and from aliphatic, alicyclic, and aromatic organic compounds, said compounds including aliphatic compounds such as methyl alcohol, ethyl alcohol, propyl alcohol, n-butyl alcohol, s-butyl alcohol, isobutyl alcohol, t-butyl alcohol, etc., halo-substituted aliphatic compounds such as carbon tetrachloride, etc.; alicyclic hydrocarbons such as cyclopentane, cyclohexane, cycloheptane, etc., alkyl-substituted cyclic hydrocarbons such as methyl cyclopentane, ethyl cyclopentane, methyl cyclohexane, etc., aromatic and alkyl-substituted aromatic hydrocarbons such as benzene, toluene, ethyl benzene, o-xylene, m-xylene, p-xylene, etc. Mixtures of these compounds with each other may also be utilized, if so desired.

The materials which may be employed as adsorbents or carriers for oxygen acids of phosphorus in the process of this invention are divided roughly into two classes. The first class comprises materials of predominantly siliceous character and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earth and clays such as bentonite, montmorillonite, acid treated clays and the like. Each adsorbent or supporting material which may be used will exert its own specific influence upon the net effectiveness of the catalyst composite which will not necessarily be identical with that of other members of the class.

In the process of this invention the organic liquid is first admixed with the siliceous adsorbent material to form a slurry. It is contemplated that the siliceous adsorbent will be treated with approximately 5 to 10 times its weight with the organic liquid and preferably from 6 to 9 times its weight. Treatment of the siliceous adsorbent with the organic liquid is preferably carried out at room temperatures. However, it may be desirable in some cases to carry out the treatment at a temperature close to the boiling point of the organic liquid used. The slurry is then treated by conventional means, such as filtration and/or vacuo, to remove substantially all of the organic liquid. The particular phosphoric acid which has been selected for the desired catalyst and the dry powdered mixture of the siliceous adsorbent which has been treated as hereinabove set forth are then admixed at temperatures ranging from about 50° to about 500° F. to form a composite in which the phosphoric acid content is usually a major proportion by weight, usually comprising from about 50 to 75% by weight of the final composite. If so desired, the phosphoric acid may be preheated to a temperature in the range of from about 230° to about 250° F. before the addition of the siliceous adsorbent from which the organic liquid was substantially removed. The composite thus formed is a slightly moist to almost dry material which has a suitable consistency for extrusion. The composite is then extruded by suitable means, for example, by a hydraulic press, and subjected to heat whereby a partial hardening of the composite is effected. After this preliminary heating, the extruded catalyst composite is then subjected to calcination at temperatures ranging from about 600° to about 1200° F. for a period of time ranging from about 1 to about 8 hours, to form a substantially solid granular catalytic material. The calcination of the formed particles of catalyst is usually carried out in an atmosphere of inert gases such as air, nitrogen, flue gas and the like. During this calcination any remaining organic liquid is driven out of the composite, thus leaving a composite consisting substantially of the phosphoric acid and the siliceous adsorbent.

One of the essential and active ingredients of the solid catalysts which are manufactured by the process of this invention for use in organic reactions is an acid of phosphorus, preferably one in which the phosphorus has a valence of 5. The acid may constitute from about 50% to about 75% by weight of the catalyst mixture ultimately produced. Of the various acids of phosphorus, orthophosphoric acid ($H_3PO_4$) and pyrophosphoric acid ($H_4P_2O_7$) find general application in the primary mixtures, due mainly to the cheapness and to the readiness with which they may be procured, although the invention is not restricted to their use, but may employ any of the other acids of phosphorus insofar as they are adaptable. However, it is not intended to infer that the different acids of phosphorus which may be employed will produce catalysts which have identical effects upon any given organic reactions as each of the catalysts produced from different acids and by slightly varying procedures will exert its own characteristic action.

In using orthophosphoric acid as one of the primary ingredients, different concentrations of the aqueous solutions may be employed, for example, acid containing from approximately 75 to 100% $H_3PO_4$ or orthophosphoric acid containing some free phosphorus pentoxide may be used. By this is meant that the ortho acid may contain a definite percentage of the pyro acid corresponding to the primary phase of dehydration of orthophosphoric acid. Within these concentration ranges, the acids will be liquids of varying viscosities and readily mixed with solid siliceous adsorbents.

Triphosphoric acid which may be represented by the formula: $H_5P_3O_{10}$ may also be used as one of the starting materials for the preparation of the catalyst of this invention. These catalytic compositions may also be prepared from the siliceous adsorbents which had been treated with organic liquids and a phosphoric acid mixture containing orthophosphoric acid, pyrophosphoric acid, triphosphoric acid, and other polyphosphoric acids.

A phosphoric acid mixture which is generally referred to as polyphosphoric acid may also be employed in this process. Polyphosphoric acid is formed by heating orthophosphoric acid or pyrophosphoric acid or mixtures thereof in suitable equipment such as carbon lined trays heated by flue gases or other suitable means to produce a phosphoric acid mixture generally analyzing from about 79% to about 85% by weight of $P_2O_5$. Such a liquid mixture of phosphoric acids with 79.4% $P_2O_5$ content was found by analysis to contain 24.5% of orthophosphoric acid ($H_3PO_4$), 45.2% of pyrophosphoric acid ($H_4P_2O_7$), 26.0% of triphosphoric acid ($H_5P_3O_{10}$), and 4.3% by weight of unidentified phosphoric acids. Another polyphosphoric acid mixture somewhat more concentrated than the one just referred to and having a $P_2O_5$ content of 84% by weight was found by analysis to contain about 57% by weight of triphosphoric acid ($H_5P_3O_{10}$), 17% by weight of hexametaphosphoric acid ($HPO_3)_6$, 11% by weight of pyrophosphoric acid $$(H_4P_2O_7)$$

5% by weight of orthophosphoric acid ($H_3PO_4$) and 10% by weight of unidentified phosphoric acids.

Another acid of phosphorus which may be employed in the manufacture of a composite catalyst according to the present invention is tetraphosphoric acid. It has the general formula: $H_6P_4O_{13}$ which corresponds to the double oxide formula: $3H_2O.2P_2O_5$ which in turn may be considered as the acid resulting when three molecules of water are lost by four molecules of orthophosphoric acid $H_3PO_4$. The tetraphosphoric acid may be manufactured by gradual or controlled dehydration or heating of orthophosphoric acid and pyrophosphoric acid or by adding phosphoric pentoxide to these acids in proper amounts. When the latter procedure is followed, phosphoric anhydride is added gradually until it amounts to 520% by weight of total water present. After a considerable period of standing at ordinary temperature, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalyst inasmuch as the crude tetraphosphoric acid mixture may be composited with the solid siliceous adsorbent which had been treated with an organic liquid and from which the organic liquid was substantially removed prior to compositing with the tetraphosphoric acid.

The resulting catalyst which has been calcined is active for promoting the polymerization of olefinic hydrocarbons, particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as hereinbefore set forth, is preferably employed as a granular layer in a heated reactor which is generally made from steel, and through which the preheated hydrocarbon fraction is directed. Thus, the solid catalyst of this invention may be employed for treating mixtures of olefin-containing hydrocarbon vapors to effect olefin polymerization, but the same catalyst may also be used at operating conditions suitable for maintaining liquid phase operation during polymerization of olefinic hydrocarbons such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of from about 100 to about 1500 p. s. i. These conditions are particularly applicable when dealing with olefin-containing material such as stabilizer reflux which may contain from approximately 10 to 50% or more of propylene and butylenes. When operating on a mixture comprising essentially butanes and butylenes, this catalyst is effective at conditions favoring the maximum utilization of both normal butylenes and isobutylene which involves mixed polymerization at temperature from about 250° to about 325° F. and a pressure of from about 500 to about 1500 p. s. i.

In utilizing the catalyst of this invention for promoting miscellaneous organic reactions, the catalysts will be employed in essentially the same way as they are used when polymerizing olefins in that the reactions are essentially in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used include the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds; isomerization reactions; ester formation by the interaction of carboxylic acids and olefins; and the like. The specific procedures for utilizing the present type of catalyst in miscellaneous organic reactions will be determined by the chemical and physical characteristics and the phase of the reacting constituents.

During the use of these catalysts in vapor phase polymerization and other vapor phase treatments of organic compounds, it is often of value to add small amounts of moisture to prevent excessive dehydration and subsequent decrease in catalyst activity. In order to substantially prevent loss of water from the catalyst, an amount of water or water vapor, such as steam is added to the charged olefin-containing gas so as to substantially balance the vapor pressure of the catalyst. This amount of water vapor varies from about 0.1 to about 6% by volume of the organic material charged.

The present invention is further illustrated with respect to specific embodiments thereof in the following example, which, however, is not intended to limit the generally broad scope of the present invention in strict accordance therewith.

EXAMPLE I 42.91 g. of a diatomaceous earth known in the trade as Celite FC was slurried with approximately 200 cc. of carbon tetrachloride. This slurry was filtered through a Büchner funnel and the resulting cake of Celite FC sucked dry by means of a vacuum. 110 g. of polyphosphoric acid was heated in an oven at 240° F. for approximately 20 minutes and thereafter mixed with the Celite for 5 minutes. The resultant composite was extruded through a 3/16" die assembly of a hydraulic press and cut into 3/16" long pills. The pills were dried under an infra-red lamp for approximately two hours; however, there was practically no loss of weight resulting from this drying. The dried pills were then calcined at a temperature of 680° F. for a period of 1.5 hours in a muffle furnace and designated as catalyst I. During the calcination period, a gentle suction was applied to the furnace to keep out the fumes. A sample of the resultant catalyst was further calcined in a muffle furnace in still air for a period of 1 hour, at a temperature of 860° F., said sample being designated as catalyst II. To determine the catalytic activity of these catalysts, 100 g. (50–50 mol percent) of a propane-propylene feed was contacted with 10 g. of the calcined pills for 2 hours at a temperature of approximately 450° F. in an 850 cc. rotating bomb. A catalyst prepared in a manner similar to that hereinbefore set forth but from a diatomaceous earth that was not treated with an organic liquid such as carbon tetrachloride before compositing said earth with a phosphoric acid, was designated as catalyst III, and also subjected to the action of a propane-propylene feed in a manner similar to the tests with catalysts I and II.

In Table I hereinafter set forth the activity and after use crushing strengths of the catalysts are shown.

*Table 1*

| Catalyst | Calcination | | Percent $C_3$ Conversion | Crushing Strength | |
|---|---|---|---|---|---|
| | Temp., °F. | Time, Hours | | Before | After |
| I | 680 | 1.5 | 63.5 | 25.9 | 24.7 |
| II | 860 | 1 | 47.1 | 26.5 | 27 |
| III | 680 | 1.5 | 54.7 | 24.7 | 25.2 |

Therefore, it is readily apparent from the comparison of the activity and after use crushing strengths of catalysts I, II and III as hereinbefore set forth in Table I that catalyst I which was calcined at the same temperature for the same period of time exhibited a greater degree of activity in converting the propane-propylene feed than did catalyst III in which the diatomaceous earth was not treated with any organic liquid prior to being composited with the phosphoric acid.

I claim as my invention:

1. A process for the manufacture of a solid phosphoric acid catalyst which comprises preparing a slurry of a siliceous adsorbent and carbon tetrachloride, substantially removing said carbon tetrachloride, compositing the siliceous adsorbent with a phosphoric acid, and extruding and calcining the resultant composite.

2. A process for the manufacture of a solid phosphoric acid catalyst which comprises preparing a slurry of a siliceous adsorbent and carbon tetrachloride, removing substantially all of said carbon tetrachloride by means of a vacuum, compositing the adsorbent with a phosphoric acid, extruding and calcining the resulting composite.

3. A process for the manufacture of a solid phosphoric acid catalyst which comprises preparing a slurry of siliceous adsorbent and carbon tetrachloride, removing substantially all of said carbon tetrachloride, compositing the remaining mixture with a phosphoric acid and subjecting the resulting mixture to extrusion and calcination at a temperature in the range of from about 600° to about 1200° F.

4. A process for the manufacture of a solid phosphoric acid catalyst which comprises preparing a slurry of siliceous adsorbent and carbon tetrachloride, removing substantially all of said carbon tetrachloride, compositing the remaining mixture with a phosphoric acid and subjecting the resulting mixture to extrusion and calcination at a temperature in the range of from about 600° to about 1200° F. for a period of time in the range of from about 1 to 8 hours.

5. A process for the manufacture of a solid phosphoric acid catalyst which comprises mixing from about 20 to about 45 parts by weight of a diatomaceous earth with from about 5 to 10 times its weight of carbon tetrachloride, removing substantially all of the carbon tetrachloride, compositing the remaining mixture with from about 50 to about 75 parts by weight of polyphosphoric acid at a temperature in the range of from about 50° to about 500° F., subjecting the resulting mixture to extrusion, calcining the extruded composite at a temperature in the range of from about 600° to about 1200° F. for a period of time in the range of from about 1 to about 8 hours.

References Cited in the file of this patent

UNITED STATES PATENTS

| | | |
|---|---|---|
| 2,507,625 | Ehrardt | May 16, 1950 |
| 2,525,144 | Mavity | Oct. 10, 1950 |
| 2,525,145 | Mavity | Oct. 10, 1950 |
| 2,691,647 | Field et al. | Oct. 12, 1954 |
| 2,693,457 | Drake et al. | Nov. 2, 1954 |